United States Patent
Durchman

(10) Patent No.: US 10,285,327 B2
(45) Date of Patent: May 14, 2019

(54) MOWER DECK CLEANING SYSTEM AND METHOD

(71) Applicant: David J Durchman, Newport, MI (US)

(72) Inventor: David J Durchman, Newport, MI (US)

( * ) Notice: Subject to any disclaimer, the term of this patent is extended or adjusted under 35 U.S.C. 154(b) by 0 days.

(21) Appl. No.: 16/118,693

(22) Filed: Aug. 31, 2018

(65) Prior Publication Data
US 2018/0368311 A1 Dec. 27, 2018

Related U.S. Application Data

(62) Division of application No. 14/656,944, filed on Mar. 13, 2015, now abandoned.

(60) Provisional application No. 62/016,175, filed on Jun. 24, 2014.

(51) Int. Cl.
- *A01D 34/00* (2006.01)
- *A01D 43/14* (2006.01)
- *B24C 1/00* (2006.01)
- *B08B 7/02* (2006.01)

(52) U.S. Cl.
CPC ........... *A01D 34/003* (2013.01); *A01D 43/14* (2013.01); *B08B 7/02* (2013.01); *B24C 1/003* (2013.01); *Y10T 29/49828* (2015.01)

(58) Field of Classification Search
CPC ... A01D 34/003; A01D 43/14; A01D 2101/00
See application file for complete search history.

(56) References Cited

U.S. PATENT DOCUMENTS

| | | |
|---|---|---|
| 2,966,023 A | 12/1960 | Carpenter |
| 2,984,061 A | 5/1961 | Stabnau |
| 3,043,482 A | 7/1962 | Laughlin |
| 3,334,475 A | 8/1967 | Danisch |
| 3,359,710 A | 12/1967 | Anderson |
| 3,375,644 A | 4/1968 | Harper |
| 3,477,212 A | 11/1969 | Coffman |
| 3,856,028 A | 12/1974 | Kehler |
| 4,901,509 A | 2/1990 | Leuz |
| 5,090,214 A | 2/1992 | LoGioco |
| 5,189,869 A | 3/1993 | McBride et al. |
| 5,673,856 A | 10/1997 | Krohn |
| 6,145,288 A | 11/2000 | Tamian et al. |
| 6,808,126 B1 | 10/2004 | Dunlap |
| 6,910,320 B1 | 6/2005 | Thorman et al. |
| 2004/0148852 A1 | 8/2004 | Musak |
| 2012/0055130 A1 | 3/2012 | Au et al. |

FOREIGN PATENT DOCUMENTS

GB 2085852 B 6/1985

*Primary Examiner* — Alicia Torres
(74) *Attorney, Agent, or Firm* — Global Intellectual Property Agency, LLC; Daniel Boudwin

(57) ABSTRACT

A lawn mower deck cleaning system and method is provided for cleaning mower decks and other interior surfaces that become layered with debris over time. The cleaning system comprises an elongated conduit affixed to the mower deck that provides a solid material from a hopper directly into the mower deck interior. The upper end of the conduit includes a hopper with upstanding sidewalls and an interior configured to support solid ice material therein. The lower end of the conduit terminates at a junction along the mower deck surface, whereby solid ice moves through the conduit, through the junction and into the mower deck interior to be jettisoned against the walls of the mower deck and ultimately pulverized by the spinning mower blade.

1 Claim, 3 Drawing Sheets

MOWER DECK CLEANING SYSTEM AND METHOD

CROSS REFERENCE TO RELATED APPLICATIONS

This application is a divisional application of U.S. patent application Ser. No. 14/656,944 filed on Mar. 13, 2015, pending, which claims the benefit of U.S. Provisional Application No. 62/016,175 filed on Jun. 24, 2014. The above identified patent applications are herein incorporated by reference in their entirety to provide continuity of disclosure.

FIELD OF THE INVENTION

The present invention relates to lawn mowers and maintenance of lawn mower decks. More specifically, the present invention relates to a new method of cleaning the underside of a lawn more deck and a structure to facilitate cleaning thereof.

BACKGROUND OF THE INVENTION

Lawn mower decks house a spinning mower blade and direct clippings and debris to a desired outlet or receptacle. It is common for mower decks to develop of a layer of clippings along the interior surface thereof, whereby lawn clippings and debris are thrown against the interior of the mower deck and often become caught therein. This is particularly true if the clippings are moist. While this is a common occurrence, allowing a mower deck to go uncleaned for long periods of time can result in reduced performance and even damage to the mower deck material if not addressed. Further, step stools configured in this manner require a storage space that is at least the size of the step stool. This is not only inconvenient, but may also cause damage to walls, floors, or cabinets where the user chooses to store the step stool. These step stools also require users to grasp the stool with their hands, which is less sanitary, especially in kitchen, bathroom, and restaurant settings. Therefore, there is a need for a step stool that can be quickly stored without taking up unnecessary space and causing damage to its surroundings. There is also a need for a step stool that a user can employ without the use of his or her hands.

Common methods of cleaning the underside of a mower deck include frictionally removing material using a brush or similar implement, as well as using a water hose to dislodge grass and other debris. While this is effective, it requires a separate cleaning process after the lawn mower has been used, adding time to the mowing activity. The present invention provides a new method of cleaning the underside of a mower deck, whereby the user can clean the mower deck while the mower is still operating. The present invention reduces time spent cleaning the mower after mowing an area of grass.

Specifically, the present invention provides a method of cleaning a lawn mower deck using a solid material while the lawn mower blade is spinning. The method involves introducing a quantity of solid material, and preferably ice, into the mower deck, whereby the mower blade pulverizes the ice and accelerates liquid and solid portions thereof against the interior surfaces of the mower deck to clean the same. The liquid and solid portions act as both a lubricant and abrasive to dislodge solid material and clean the interior surface of the mower deck. This causes dirt and clippings to enter the collection bag or otherwise ejected from the mower deck. To facilitate the introduction of solid ice, an elongated snorkel assembly and ice hopper is provided, whereby the snorkel connects to the mower deck and can communicate the cubed ice from the ice container to the interior of the mower deck. Use with both push mower and ride-on mower decks are contemplated.

SUMMARY OF THE INVENTION

In view of the foregoing disadvantages inherent in the known types of cleaning systems now present in the prior art, the present invention provides a new type of mower deck cleaning system that utilizes solid ice to clean the mower deck interior surfaces while the mower is operating.

It is therefore an object of the present invention to provide a new and improved mower deck cleaning system that has all of the advantages of the prior art and none of the disadvantages.

It is another object of the present invention to provide a mower deck cleaning system that removes dirt, debris, and compacted grass clippings from the interior surfaces of a mower deck without requiring the user to manually remove the same with hand tools or a power washer.

Another object of the present invention is to provide a mower deck cleaning system that can clean the interior surfaces of a mower deck while the lawn mower is in operation and the mower blade is turning, whereby cleaning operations can be commenced at the beginning or end of landscaping duties.

Yet another object of the present invention is to provide a mower deck cleaning system that can be deployed on mower decks of ride-on mowers, push mowers, and even rotary equipment that is not specifically related to cutting grass or landscaping (i.e. other industrial equipment with spinning elements).

Another object of the present invention is to provide a mower deck cleaning system that utilizes solid ice as a means of lubricating and frictionally removing debris from the interior surfaces of the mower deck, whereby the mower blade accelerates the ice against the interior surfaces as the blade spins, causing portions of the ice to impact the walls and causing the ice to quickly become pulverized into liquid water.

Another object of the present invention is to provide a mower deck cleaning system that comprises an elongated snorkel or conduit that connects to the mower deck, extends upwards, and terminates at a solid ice hopper, whereby the user can place ice within the hopper to introduce the ice into the mower deck interior space for cleaning purposes.

A final object of the present invention is to provide a mower deck cleaning system that may be readily fabricated from materials that permit relative economy and are commensurate with durability, and one that can be incorporated in new production models of mowers or retrofitted onto existing mower decks currently on the market.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows an overhead perspective view of the mower deck cleaning system of the present invention, along with a close-up view of the ice hopper disposed above the mower deck.

DETAILED DESCRIPTION OF THE INVENTION

Figure 1:
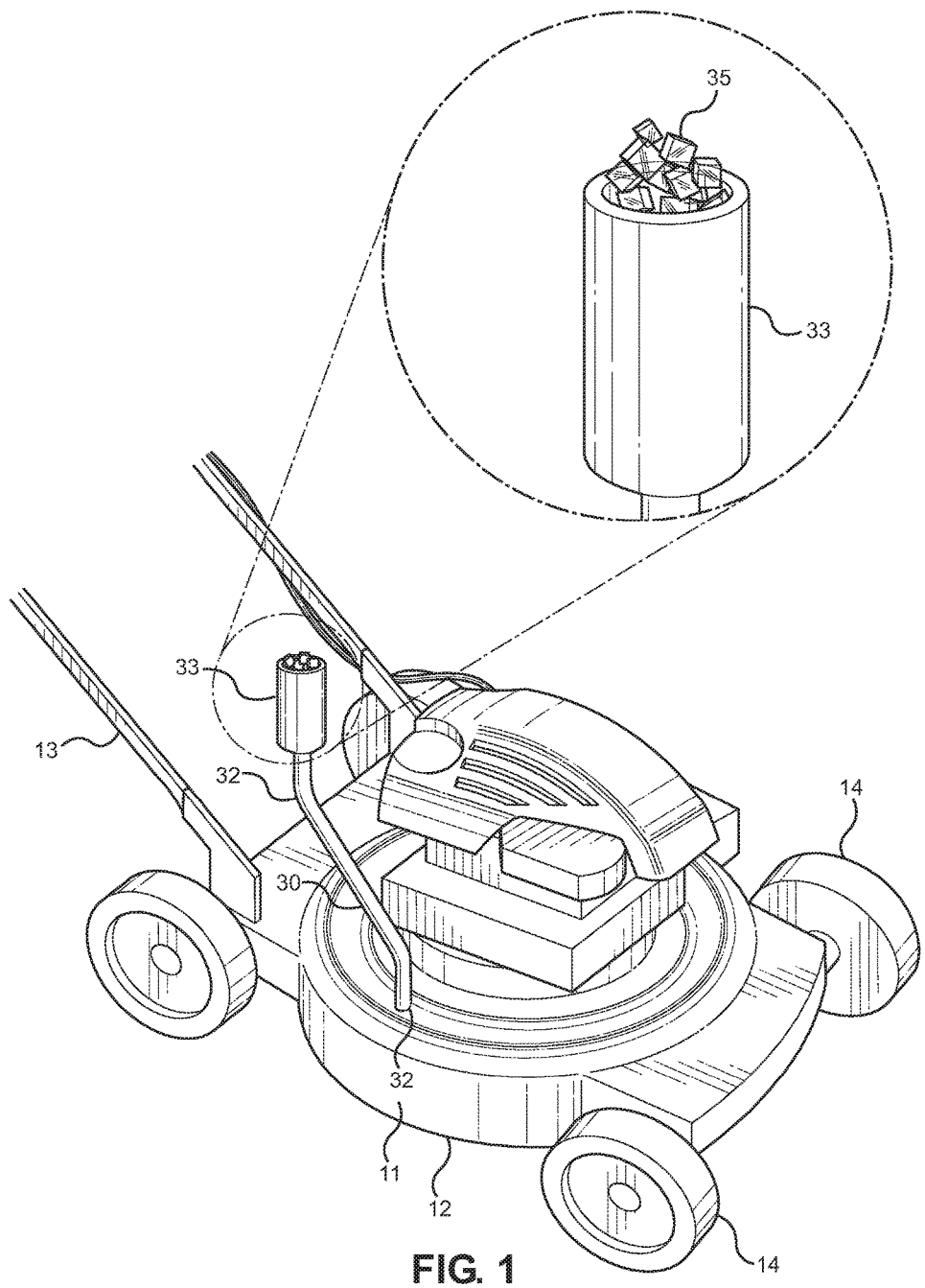

Reference is made herein to the attached drawings. Like reference numerals are used throughout the drawings to depict like or similar elements of the mower deck cleaning system of the present invention. For the purposes of presenting a brief and clear description of the present invention, the preferred embodiment will be discussed as used for cleaning the underside of a mower deck or similar machinery with a spinning element by way of the introduction of ice thereinto, whereby the ice both frictionally removes debris and introduces water as a lubricate to liberate the same. The figures are intended for representative purposes only and should not be considered to be limiting in any respect.

Referring now to FIG. 1, there is shown a view of one contemplate embodiment of the mower deck cleaning system of the present invention. The mower deck cleaning system is one that is configured to remove dirt, debris, and layered clippings from the mower deck interior surfaces that have accumulated thereon during use of the lawnmower. Typical lawn mowers, including push mowers and ride-on mowers, comprise a mower deck 11 having a substantially rounded shape that forms a housing with enclosed sides, an upper surface, and an open lower surface 12. Within the mower deck 11 is a spinning mower blade that is used to cut grass to a certain level as the mower passes thereover. For push mowers, the mower deck 11 is supported by a plurality of roller wheels 14 and an engine or motor is used to power the mower blade.

The mower is moved based on the user's motive input into the handle 13. For ride-on mowers, a wheeled vehicle is propelled by an engine or motor, and one or more mower decks are supported thereunder. A user sits or stands on the ride-on mower, whereby the engine or motor directly drives a blade or a pulley or belt system drives the blades of each mower deck.

The mower deck cleaning system of the present invention is one that utilizes a means of introducing a solid material into the mower deck interior to frictionally remove material from the interior surfaces thereof. The solid material is introduced into the mower deck interior while the mower blade is spinning, whereby the material contacts the mower blade and is accelerated against the interior walls of the mower deck. The high energy impact of the solid material against the walls of the mower deck release built-up debris and clippings therefrom, which fall through the open lower 12 of the mower deck and release from the interior walls. The introduction of solid material into the mower deck commences when the mower is operational, either before or after landscaping duties to clean the interior surfaces thereof.

The preferred solid material is discrete portions of solid water, which are introduced into the mower deck using a snorkel assembly 30 disposed above the mower deck 11. The solid water may be provided in the form of cubed ice traditionally prepared in homes within a freezer, ice chunks commercially purchased, or any other form of solid water that is provided in discrete forms such that the portions can be individually handed and readily communicate through the conduit. For the purpose of clarity, the preferred material will be referred to herein as solid water or solid ice material, interchangeably. Use of an ice material serves dual purposes: the material when contacted by the spinning mower blade is either directly accelerated against the walls of the mower deck or broken into smaller chunks, and the ice becomes pulverized into liquid form to create lubrication within the mower deck interior. The combined effect of solid material impacts and introduction of water loosens the material against the interior walls of the mower deck, thereby causes release thereof such that the mower deck is cleaned of debris and potential interferences with the spinning mower blade.

Removal of material also actively prevents corrosion of the mower deck, as the paint or sealant thereover is preserved and not affected by the debris otherwise layered thereon.

The snorkel assembly 30 of the present invention comprises an upstanding conduit 31 that connects to the mower deck 11 at a junction 32 and allows the solid material 35 to move from a hopper 33 and into the mower deck interior using a gravity feed. The conduit 31 comprises an elongated, hollow pipe that is sized to receive the solid material with minimal interference. The conduit 31 may include a linear design, extending in a vertical direction; or alternatively the conduit may include one or more elbows or turns that are designed to position the hopper 33 in an opportune location for the user based on the geometry of the mower.

Figure 2:
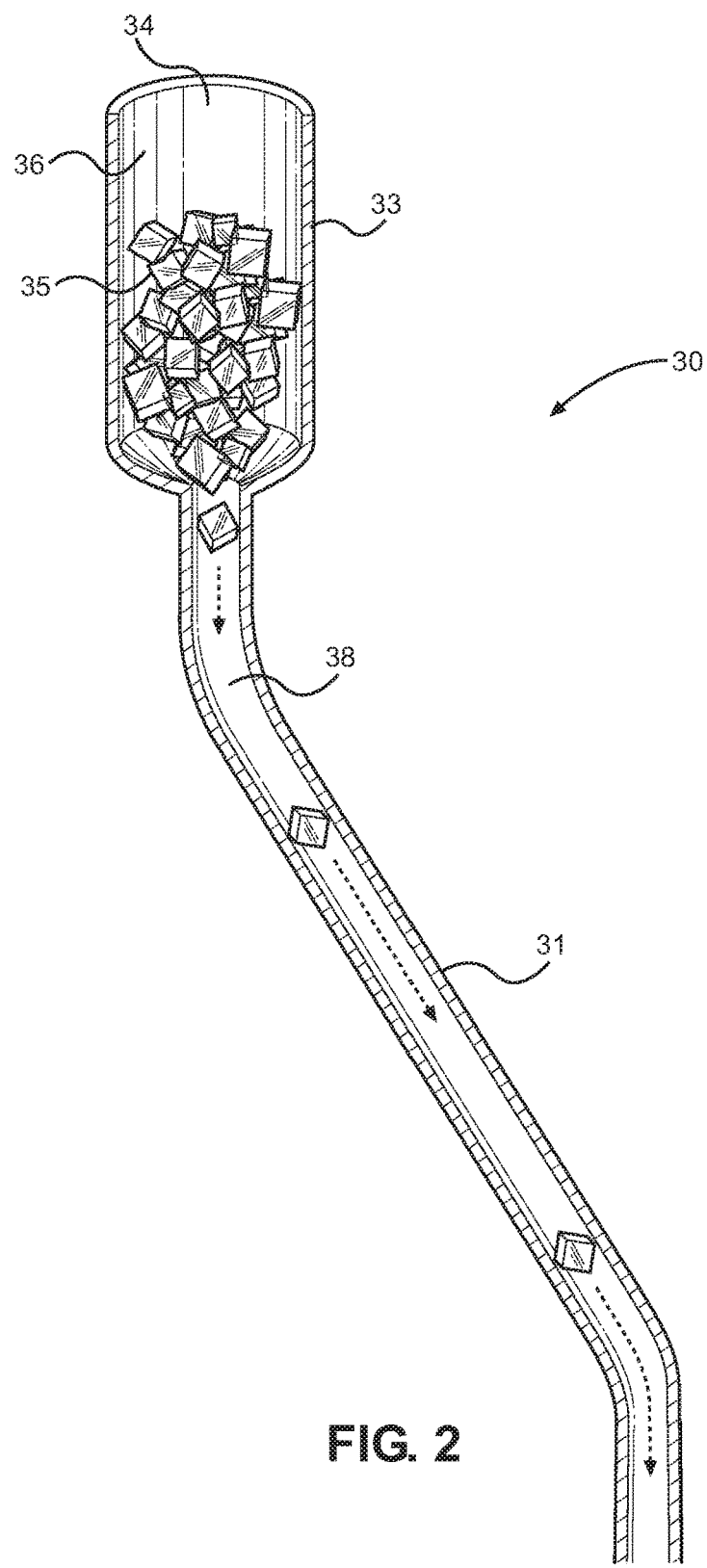
FIG. 2 shows a cross-section view of the ice hopper of the present invention and cubes thereof being introduced into the mower deck through the conduit.

Referring FIGS. 1 and 2, the snorkel assembly 30 is shown in both a close-up view and in a cross-section view for clarity. The hopper 33 comprises an upstanding housing having sidewalls, an interior volume 36, an open upper end 34, and an upper edge around the open upper end 34. The hopper 33 is one that is configured to support the solid material 35 therein, whereby the user is not required to introduce one article of solid material at a time but can put the material into the hopper 33 in bulk.

Below the hopper and connected thereto is the conduit 31. The conduit includes an open interior 38 and is connected to an opening along the lower portion of the hopper 33. The solid material 35 from the hopper 33 can therefore funnel into the conduit interior 38 once introduced into the interior 36 of the hopper. The lower opening of the hopper 33 and the cross-section of the conduit interior 38 are such that cubed ice may be used as the solid material 35 and the ice can readily enter the lower opening and fall through the conduit 31 with minimal resistance.

Figure 3:
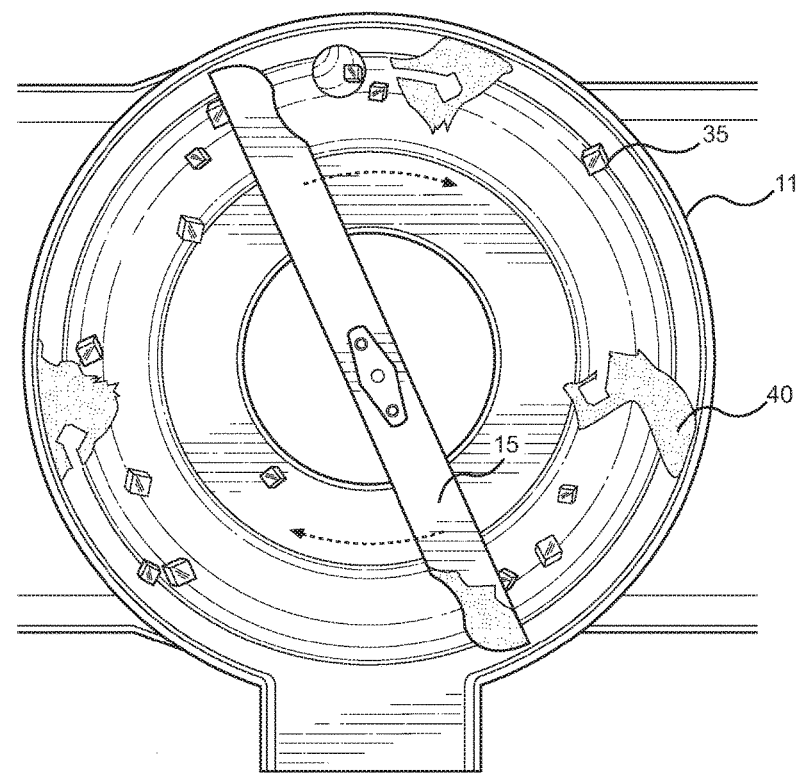
FIG. 3 shows an underside view of a typical mower deck assembly and the ice being introduced thereinto for cleaning purposes.

Referring to FIG. 3, there is shown an underside view of a typical lawn mower deck 11, whereby the spinning mower blade 15 is visualized and the junction 32 between the mower deck 11 and the solid material conduit is shown. The final step in the clean process is to run the mower such that the mower blade 15 is rotating within the mower deck 11 while introducing the solid material 35 into the mower deck interior using the snorkel system. The solid material 35 is received within the mower deck interior and contacts the spinning mower blade 15, which is rotating at a high speed.

The energy of the impact between the solid material 35 and the mower blade 15 causes the solid material to undergo several alternative operations.

Depending on the failure strength of the material 35, the mower blade 15 will accelerate the solid material 35 against the interior surfaces of the mower deck 11 upon contact therewith. Alternatively, the mower blade 15 will pulverize the solid material upon contact therewith. Finally, if the solid material comprises ice, the ice will melt into a liquid water 40 as it is pulverized and impacted by the blade and the various interior surfaces of the mower deck 11. The combination of the pulverized solid material 35 and the liquid water 40 act as a frictional or abrasive contact, as well as a lubricant, to remove debris from the mower deck interior. Coupled with the impact of the mower blade 15 thereon, the pulverized solid material 35 or the liquid water 40 provide a substantial abrasive force for the removal of debris on the interior surfaces of the mower deck 11 upon contact therewith. The solid material 35 remaining falls to the ground below the mower deck or is jettisoned from the mower deck through a mower deck outlet 16, which can be open or connected to a collection bag.

Overall, the present invention provides a means to clean mower decks and the interior surfaces of other rotary machinery using the introduction of solid material, whereby the preferred material is cubed or other solid ice. Lawn cuttings and other debris often is layered against the interior surfaces of a mower deck, particularly if the mow operation is conducted when the lawn is moist. This layering of debris can inhibit the performance of the mower, and eventually cause corrosion of its structure. The present invention contemplates a new system and method of cleaning the interior surfaces thereof, without the need for a pressure washer and manual cleaning tools. The present invention can clean the interior surfaces while the mower is running, without causing downtime of the mower and without causing additional tasks for the owner. The owner simply introduces the solid material into the snorkel assembly, which feeds the material into the mower deck such that the spinning mower blade accelerates the same against the walls of the mower deck. The method and system is suitable for mowers of all types, as well as other dynamic machinery with spinning elements and partially enclosed housing that must be periodically cleaned.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claimed invention.

I claim:

1. A method of cleaning a mower deck interior, comprising:
   connecting an assembly to a mower deck at a junction, wherein the assembly comprises a conduit;
   wherein the junction comprises an opening through the mower deck configured to allow a solid material to pass therethrough and into the mower deck interior;
   positioning the solid material within the conduit, the conduit configured to communicate into the assembly;
   wherein the opening extends to the mower deck and facilitates the flow of the solid material therethrough;
   pulverizing the solid material via a mower blade upon contact therewith;
   wherein the solid material comprises ice.

* * * * *